(12) United States Patent
Metcalfe et al.

(10) Patent No.: US 9,679,356 B2
(45) Date of Patent: Jun. 13, 2017

(54) VECTORIZED TWO STAGE TILE-BASED SCALING

(71) Applicant: Xerox Corporation, Norwalk, CT (US)

(72) Inventors: Ryan D. Metcalfe, Fairport, NY (US); David J. Metcalfe, Marion, NY (US)

(73) Assignee: Xerox Corporation, Norwalk, CT (US)

( * ) Notice: Subject to any disclaimer, the term of this patent is extended or adjusted under 35 U.S.C. 154(b) by 15 days.

(21) Appl. No.: 14/662,366

(22) Filed: Mar. 19, 2015

(65) Prior Publication Data

US 2016/0275644 A1  Sep. 22, 2016

(51) Int. Cl.
*G06T 3/40* (2006.01)

(52) U.S. Cl.
CPC ................... *G06T 3/4007* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,471,349 A * | 9/1984 | Strolle | ...................... | G06F 1/02 345/657 |
| 5,204,916 A | 4/1993 | Hamilton, Jr. et al. | | |
| 5,237,432 A * | 8/1993 | Calarco | ...................... | G06T 3/60 358/1.9 |
| 5,297,217 A * | 3/1994 | Hamilton, Jr. | ......... | G06T 3/0006 358/3.07 |
| 5,301,036 A | 4/1994 | Barrett et al. | | |
| 5,369,504 A * | 11/1994 | Walker | ................. | H04N 1/0473 358/437 |
| 5,793,379 A * | 8/1998 | Lapidous | .............. | G06T 3/4007 345/428 |
| 6,181,834 B1 * | 1/2001 | Li | ......................... | G06T 3/4007 358/1.9 |
| 8,086,037 B2 | 12/2011 | Yang | | |
| 8,311,368 B2 | 11/2012 | Magai et al. | | |
| 8,649,635 B2 * | 2/2014 | Liu | ..................... | H04N 7/0122 382/298 |
| 8,687,922 B2 * | 4/2014 | Tripathi | ................ | G06T 3/4007 382/260 |
| 9,269,144 B2 * | 2/2016 | Kraus | .................... | A61B 3/102 |
| 2001/0048772 A1 * | 12/2001 | Carney | ................. | G06T 3/4007 382/298 |
| 2013/0142396 A1 * | 6/2013 | Fletcher | .................. | G06T 7/004 382/106 |

* cited by examiner

*Primary Examiner* — Anand Bhatnagar
(74) *Attorney, Agent, or Firm* — Kevin Soules; Kermit D. Lopez; Luis M. Ortiz

(57) ABSTRACT

Image scaling disclosed herein comprises receiving an image from an image capturing device and partitioning an image into at least one image tile using a partitioning module. A determination is made if the image tile requires slow scan scaling and/or fast scan scaling. The image tile is subject to slow scan scaling. The image tile is then transposed, scaled in the fast scan direction, and then again transposed to an original orientation. The tile is reassembled into a scaled image and may be rendered by a rendering device.

20 Claims, 13 Drawing Sheets

VECTORIZED TWO STAGE TILE-BASED SCALING

FIELD OF THE INVENTION

Embodiments are generally related to the field of computing. Embodiments are also related to methods and systems for scaling images. Embodiments are further related to methods and systems for two stage tile-based image scaling.

BACKGROUND

Image scaling is a widely known image processing utility used to resize a digital image. Image scaling has widespread applications in multi-media associated with handheld devices (i.e., mobile phones, PDAs, handheld game consoles, mobile media players, digital cameras, etc.). The computational requirements required to achieve adequate image quality of scaled output images can be quite extensive, and in some cases, becomes the overall system-level bottleneck. This is especially important in applications where the user is interactively viewing and resizing images in real time. High-speed image scaling operations are also required in multi-function reprographics (Multi-Function Device) applications, where the rated speed of the document scanner ultimately dictates the rate at which the video must be processed.

In the past, image scaling was often performed in hardware, mainly because the generally available microprocessors could not achieve the rated processing speeds needed for image scaling operations. However, as microprocessors improve, their processing speeds have become sufficient for image scaling operation. Therefore, a need in the art exists for software-based image path (SWIP) solutions to replace traditional hardware-based solutions.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for scaling images.

It is another aspect of the disclosed embodiments to provide a method and system for advantageously scaling images using parallel processing.

It is yet another aspect of the disclosed embodiments to provide an enhanced method and system for tile-based image scaling.

It is another aspect of the disclosed embodiments to provide multi-step, tile-based architecture that provides multi-threading capability, but also leverages the latest SIMD intrinsics for efficient image scaling.

The aforementioned aspects and other objectives and advantages can now be achieved as described herein. A method and system for image scaling disclosed herein comprises receiving an image from an image capturing device and partitioning an image into at least one image tile using a partitioning module. A determination is made if the image tile requires slow scan scaling and/or fast scan scaling. The image tile is subject to slow scan scaling. The image tile is then transposed, scaled in the fast scan direction, and then again transposed to an original orientation. The tile is reassembled into a scaled image and may be rendered by a rendering device.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
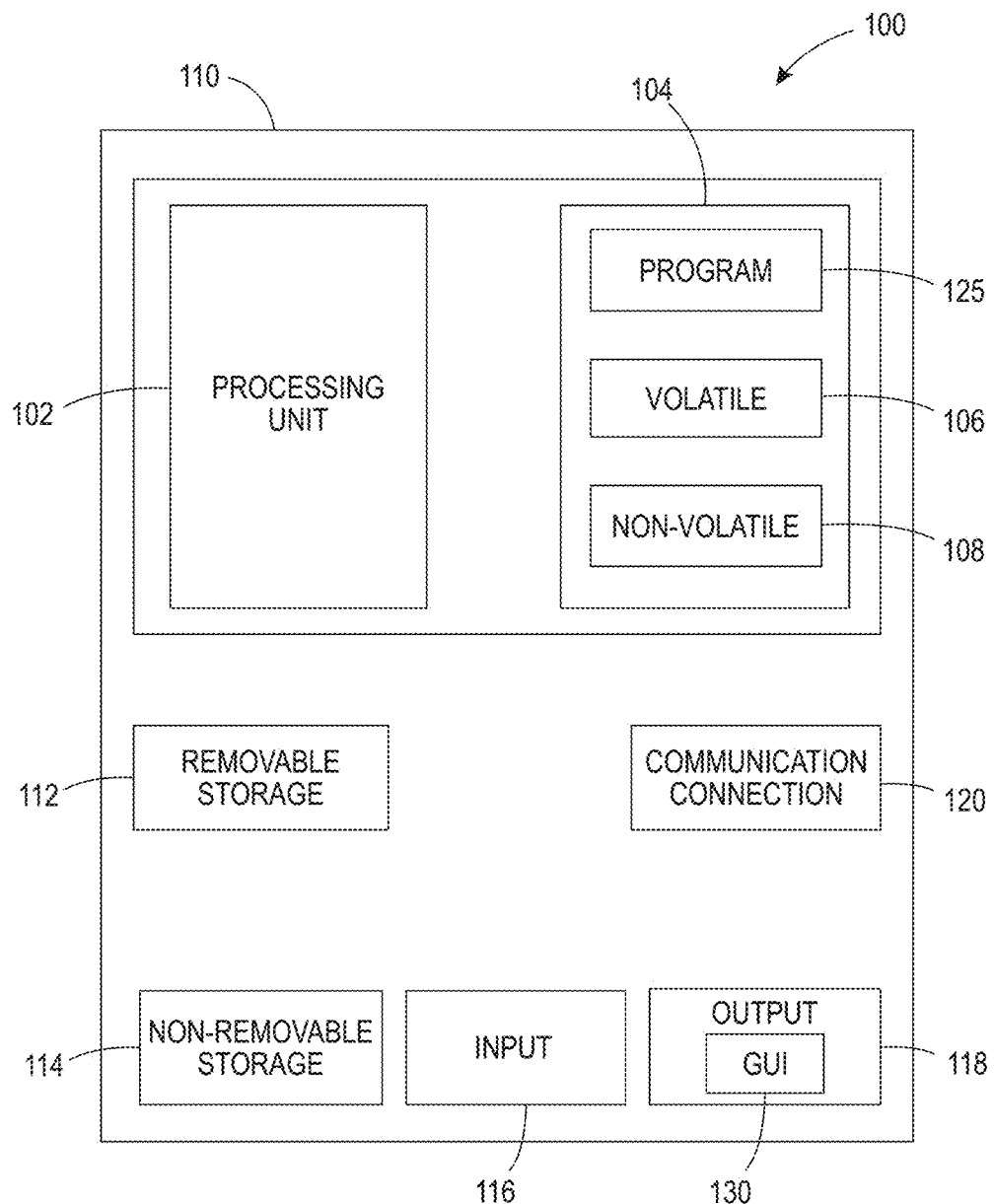
FIG. 1 depicts a block diagram of a computer system which is implemented in accordance with the disclosed embodiments.
Figure 2:
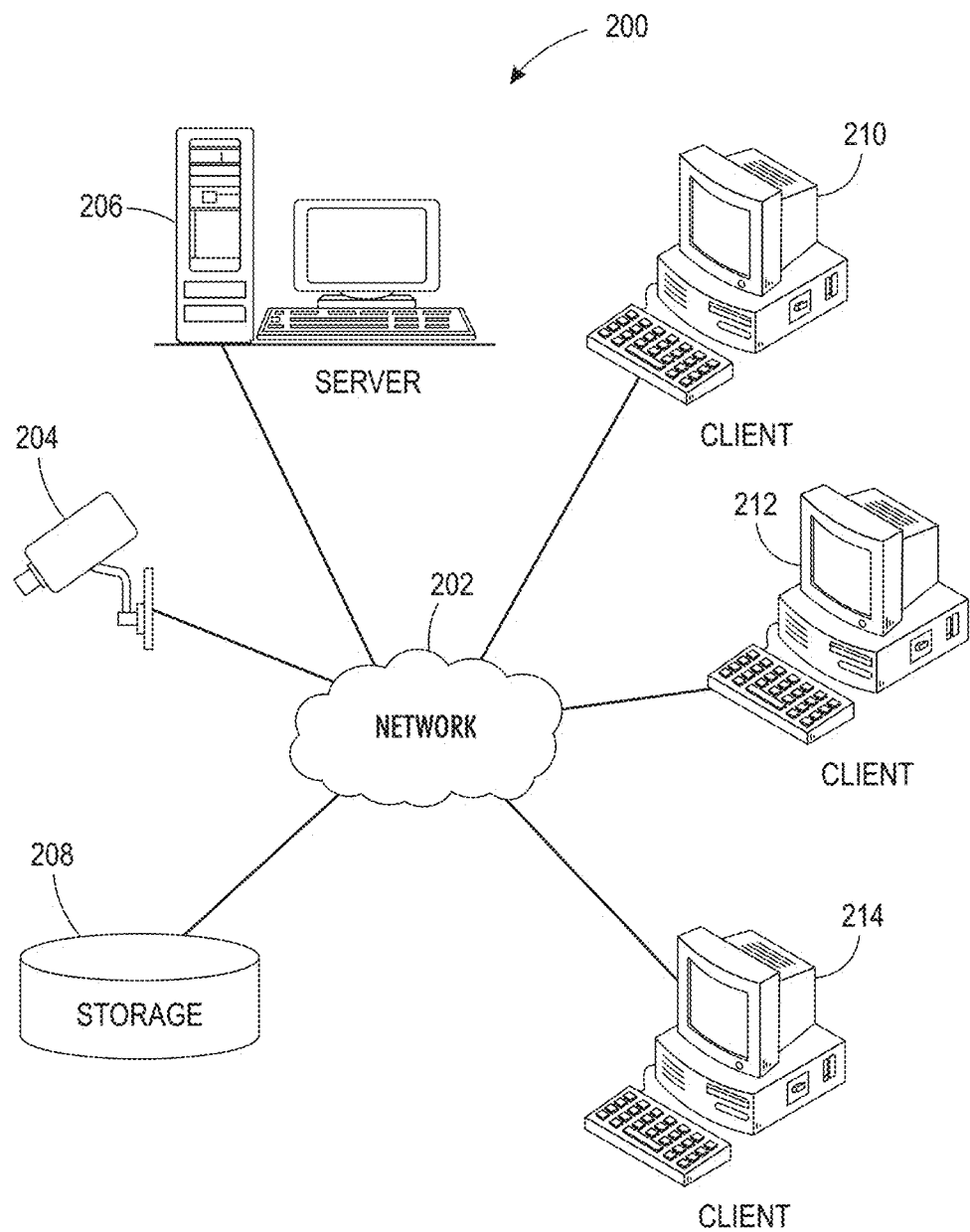
FIG. 2 depicts a graphical representation of a network of data-processing devices in which aspects of the present invention may be implemented.
Figure 3:
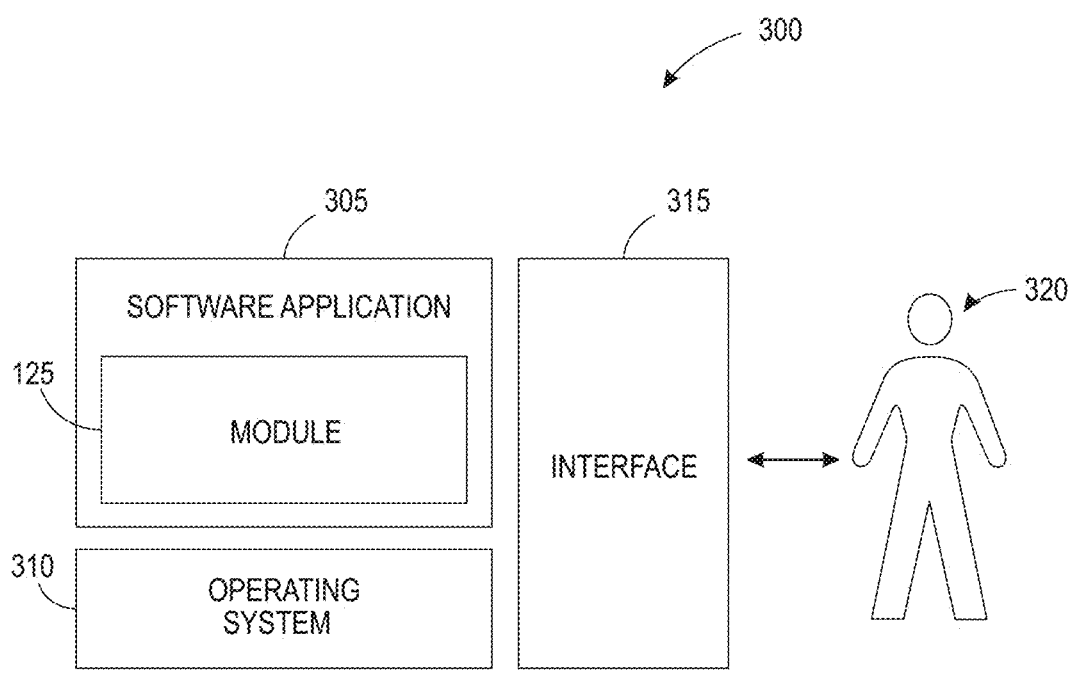
FIG. 3 depicts a computer software system for directing the operation of the data-processing system depicted in FIG. 1, in accordance with an embodiment of the invention.

FIGS. 1-3 are provided as exemplary diagrams of data-processing environments in which embodiments of the present invention may be implemented. It should be appreciated that FIGS. 1-3 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

A block diagram of a computer system 100 that executes programming for implementing parts of the methods and systems disclosed herein is shown in FIG. 1. A computing device in the form of a computer 110 configured to interface with sensors, peripheral devices, and other elements disclosed herein may include one or more processing units 102, memory 104, removable storage 112, and non-removable storage 114. Memory 104 may include volatile memory 106 and non-volatile memory 108. Computer 110 may include or have access to a computing environment that includes a variety of transitory and non-transitory computer-readable media such as volatile memory 106 and non-volatile memory 108, removable storage 112 and non-removable storage 114. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including image data.

Computer 110 may include or have access to a computing environment that includes input 116, output 118, and a communication connection 120. The computer may operate in a networked environment using a communication connection 120 to connect to one or more remote computers, hand-held devices, printers, copiers, faxes, multi-function devices (MFDs), mobile devices, mobile phones, Smartphone, or other such devices. The remote computer may also include a personal computer (PC), server, router, network PC, a peer device or other common network node, or the like. The communication connection may include a Local Area Network (LAN), a Wide Area Network (WAN), Bluetooth connection, or other networks. This functionality is described more fully in the description associated with FIG. 2 below.

Output 118 is most commonly provided as a computer monitor, but may include any output device. Output 118 may also include a data collection apparatus associated with computer system 100. In addition, input 116, which commonly includes a computer keyboard and/or pointing device such as a computer mouse, computer track pad, or the like, allows a user to select and instruct computer system 100. A user interface can be provided using output 118 and input 116. Output 118 may function as a display for displaying data and information for a user and for interactively displaying a graphical user interface (GUI) 130.

Note that the term "GUI" generally refers to a type of environment that represents programs, files, options, and so forth by means of graphically displayed icons, menus, and dialog boxes on a computer monitor screen. A user can interact with the GUI to select and activate such options by directly touching the screen and/or pointing and clicking with a user input device 116 such as, for example, a pointing device such as a mouse and/or with a keyboard. A particular item can function in the same manner to the user in all applications because the GUI provides standard software routines (e.g., module 125) to handle these elements and report the user's actions. The GUI can be further used to display the electronic service image frames as discussed below.

Computer-readable instructions, for example, program module or node 125, which can be representative of other modules or nodes described herein, are stored on a computer-readable medium and are executable by the processing unit 102 of computer 110. Program module or node 125 may include a computer application. A hard drive, CD-ROM, RAM, Flash Memory, and a USB drive are just some examples of articles including a computer-readable medium.

FIG. 2 depicts a graphical representation of a network of data-processing systems 200 in which aspects of the present invention may be implemented. Network data-processing system 200 is a network of computers or other such devices such as mobile phones, smartphones, MFDs, and the like in which embodiments of the present invention may be implemented. Note that the system 200 can be implemented in the context of a software module such as program module 125. The system 200 includes a network 202 in communication with one or more clients 210, 212, and 214. Network 202 may also be in communication with one or more image capturing devices 204, servers 206, and storage 208. Network 202 is a medium that can be used to provide communications links between various devices and computers connected together within a networked data processing system such as computer system 100. Network 202 may include connections such as wired communication links, wireless communication links or various types, and fiber optic cables. Network 202 can communicate with one or more servers 206, one or more external devices such as sensor or video capturing device 204, and a memory storage unit such as, for example, memory or database 208.

In the depicted example, video camera 204, server 206, and clients 210, 212, and 214 connect to network 202 along with storage unit 208. Clients 210, 212, and 214 may be, for example, personal computers or network computers, handheld devices, mobile devices, tablet devices, smartphones, personal digital assistants, printing devices, MFDs, etc. Computer system 100 depicted in FIG. 1 can be, for example, a client such as client 210 and/or 212.

Computer system 100 can also be implemented as a server such as server 206, depending upon design considerations. In the depicted example, server 206 provides data such as boot files, operating system images, applications, and application updates to clients 210, 212, and/or 214. Clients 210, 212, 214 and camera 204 are clients to server 206 in this example. Network data-processing system 200 may include additional servers, clients, and other devices not shown. Specifically, clients may connect to any member of a network of servers, which provide equivalent content.

In the depicted example, network data-processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, government, educational, and other computer systems that route data and messages. Of course, network data-processing system 200 may also be implemented as a number of different types of networks such as, for example, an intranet, a local area network (LAN), or a wide area network (WAN). FIGS. 1 and 2 are intended as examples and not as architectural limitations for different embodiments of the present invention.

FIG. 3 illustrates a software system 300, which may be employed for directing the operation of the data-processing systems such as computer system 100 depicted in FIG. 1. Software application 305 may be stored in memory 104, on removable storage 112, or on non-removable storage 114 shown in FIG. 1, and generally includes and/or is associated with a kernel or operating system 310 and a shell or interface 315. One or more application programs, such as module(s) or node(s) 125, may be "loaded" (i.e., transferred from non-removable storage 114 into the memory 104) for execution by the data-processing system 100. The data-processing system 100 can receive user commands and data through user interface 315, which can include input 116 and output 118, accessible by a user 320. These inputs may then be acted upon by the computer system 100 in accordance with instructions from operating system 310 and/or software application 305 and any software module(s) 125 thereof.

Generally, program modules (e.g., module 125) can include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations such as, for example, hand-held devices, mobile phones, smartphones, tablet devices, multi-processor systems, printers, copiers, fax machines, multi-function devices, data networks, microprocessor-based or programmable consumer electronics, networked personal computers, minicomputers, mainframe computers, servers, and the like.

Note that the term module or node as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application such as a computer program designed to assist in the performance of a specific task such as word processing, accounting, inventory management, etc., or a hardware component designed to equivalently assist in the performance of a task.

The interface 315 (e.g., a graphical user interface 130) can serve to display results, whereupon a user 320 may supply additional inputs or terminate a particular session. In some embodiments, operating system 310 and GUI 130 can be implemented in the context of a "windows" system. It can be appreciated, of course, that other types of systems are possible. For example, rather than a traditional "windows" system, other operation systems such as, for example, a real time operating system (RTOS) more commonly employed in wireless systems may also be employed with respect to operating system 310 and interface 315. The software application 305 can include, for example, module(s) 125, which can include instructions for carrying out steps or logical operations such as those shown and described herein.

The following description is presented with respect to embodiments of the present invention, which can be embodied in the context of or require the use of a data-processing system such as computer system 100 in conjunction with program module 125, data-processing system 200, and network 202 depicted in FIGS. 1-3. The present invention, however, is not limited to any particular application or any particular environment. Instead, those skilled in the art will find that the system and method of the present invention may be advantageously applied to a variety of system and application software including database management systems, word processors, and the like. Moreover, the present invention may be embodied on a variety of different platforms including Windows, Macintosh, UNIX, LINUX, Android, and the like. Therefore, the descriptions of the exemplary embodiments, which follow, are for purposes of illustration and not considered a limitation.

Techniques to accelerate image scaling are of considerable interest. Numerous algorithms exist to resize a digital image such as nearest-neighbor, bilinear/bicubic interpolation, perspective projection, etc., each with varying degrees of computational complexity and image quality advantages and disadvantages. The embodiments herein provide methods and systems to resize a digital image using the latest processors offering customers the highest image quality possible for documents rendered via MFDs and in multimedia applications.

In one embodiment of the invention, a two-stage scaling architecture is proposed that exploits single-instruction, multiple-data (SIMD) technology, and multi-threading capabilities available with multi-core processors. In order to utilize multi-threading for high-speed applications, the image is first split into multiple tiles. A single thread can service each tile. The scaling operation is performed on each tile in multiple steps. First, a resizing operation is accomplished in the traditional "slow scan" direction. The second scaling operation is executed in the "fast scan" direction. However, before scaling in the fast scan direction, the image tile is transposed, providing more favorable processing via SIMD vectorization as described herein. The tile is then transposed back to its original orientation. The proposed architecture has been shown to accelerate the overall image processing throughput rate by as much as five times as compared to traditional one-stage scalar image scaling. Accordingly, the proposed invention provides a unique multi-step, tile-based architecture that provides multi-threading capability, but also leverages the latest SIMD intrinsics available from today's advanced, lower-cost multi-core processors. The higher-speeds achieved by this approach are better than those known in the industry.

Digital scaling is computationally intensive. However, relying on multi-threading alone assumes that an unlimited number of threads can be accessed at a time. In practice, the number of threads is limited. Relying on multi-threading alone therefore results in minimal acceleration when scaling is incorporated within a copy-path (such as the copy path 400 shown in FIG. 4) consisting of multiple image-processing nodes or modules. As a consequence, relying on multi-threading alone to accelerate the processing of an individual software node or module does not necessarily result in an improvement in the overall copy-path processing throughput rate, since these threads are also needed to concurrently process the image-tiles for the other software nodes contained within the image path.

Figure 4:
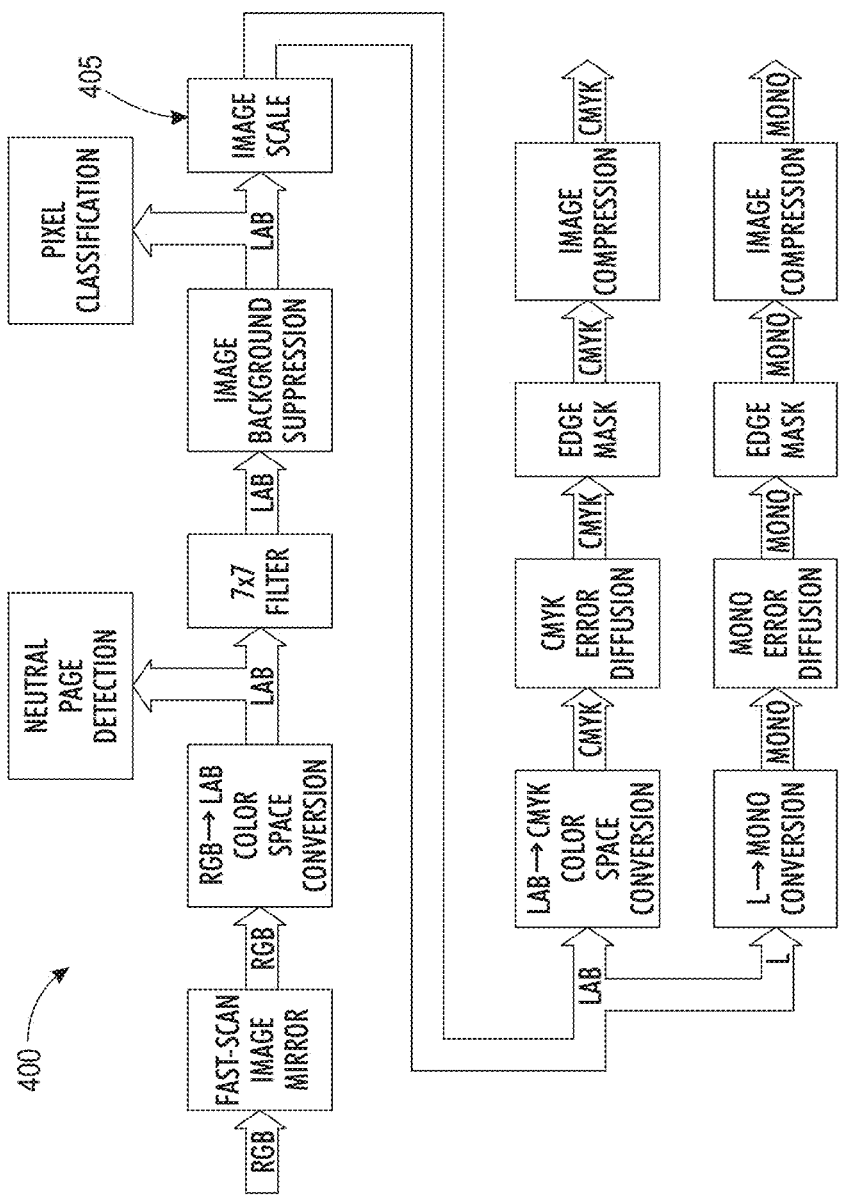
FIG. 4 depicts a software-based image path in accordance with an embodiment of the present invention.

FIG. 4 illustrates an exemplary block diagram 400 of auto-color image processing nodes in a copy path, in accordance with an embodiment of the invention. A fixed number of cores can be deployed to process image-tiles for each of the image processing nodes depicted in FIG. 4. In the case where the number of processing nodes exceeds the number of processor cores, utilizing data parallelism as described herein improves the copy-path's 400 overall throughput rate. Of particular importance in FIG. 4 is the image scaling node 405. Image scaling node 405 provides sub-nodes for accomplishing the image scaling described herein.

Single instruction, multiple data (SIMD) describes computers with multiple processing elements that perform the same operation on multiple data points simultaneously. In embodiments of the present invention, SIMD instructions accelerate the video throughput rate by processing multiple amounts of data in parallel as opposed to loading and processing one operation (or pixel) at a time. Parallel operations take place within dedicated "vector" registers. In one embodiment, the processors used to process the image path 400 illustrated in FIG. 4 have a maximum vector register width of 128 bits which can be cast to 8-bit, 16-bit, or 32-bit concatenated signed or unsigned integer values, as desired and depending upon application. The ability to apply the same arithmetic operations in parallel is the key mechanism for parallel data acceleration. For example, the ability to process four pixels via SIMD operations is four times faster than the same operation completed with scalar processing. Increases in vector register widths of processors will scale accordingly.

Image scaling can be performed in multiple directions. Vertical scaling is generally referred to as the "slow scan" direction and horizontal scaling is generally referred to as the "fast scan" direction. Using SIMD vector registers to perform scaling in the fast scan direction is problematic because the output seed factor, or "stride," is out of phase relative to the native input pixel grid. In general, SIMD intrinsics do not efficiently perform horizontal inter-element pixel arithmetic operations.

Figure 5A:
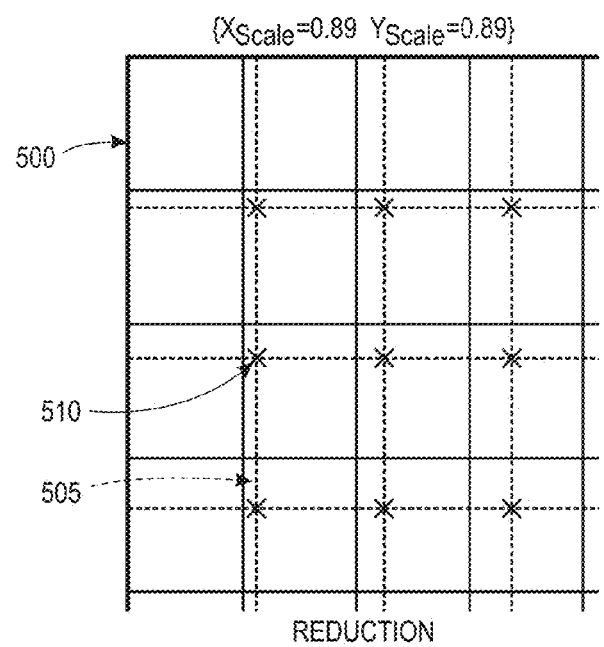
FIG. 5A depicts a diagram illustrating image scaling in accordance with an embodiment of the present invention.
Figure 5B:
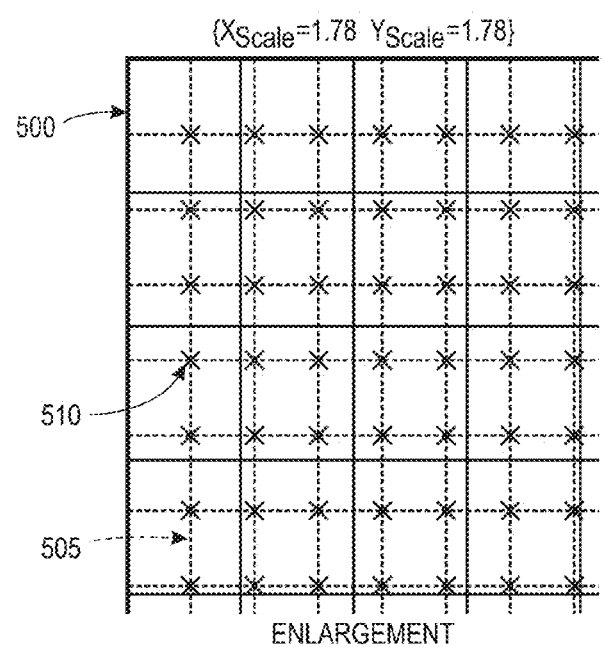
FIG. 5B depicts a diagram illustrating image scaling in accordance with an embodiment of the present invention.

FIGS. 5A and 5B illustrate the difficulty in applying SIMD operations to perform image reduction (in FIG. 5A) and/or enlargement (in FIG. 5B). Input grid 500 is representative of an incoming image pixel grid. In general, the output grid 505 can vary widely as a function of both the X and Y scaling factors. FIGS. 5A and 5B illustrate two such scaling scenarios. The output grid 505 and grid points 510 of the output image grid 505 are superimposed on the input grid 500. Processing the scaled output pixels in a parallel fashion becomes problematic whenever the pixel-to-register mapping (e.g., pixel swizzling operations) requires individual load and/or store accesses in order to properly format the SIMD registers.

Figure 6A:
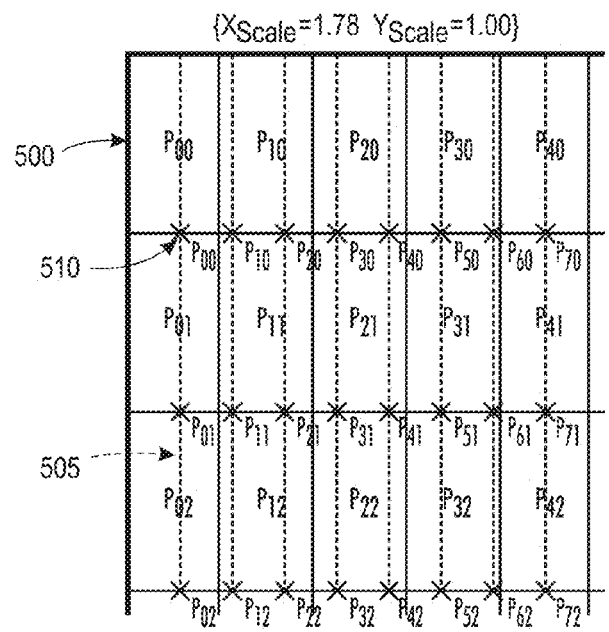
FIG. 6A depicts a diagram illustrating image scaling in accordance with an embodiment of the present invention.
Figure 6B:
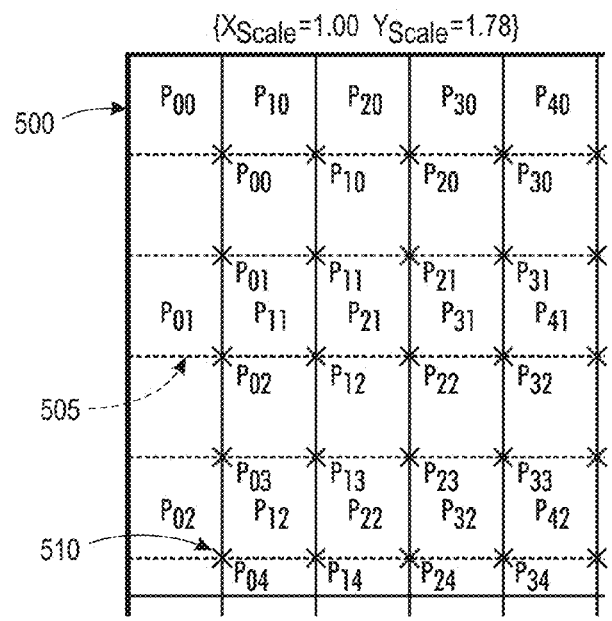
FIG. 6B depicts a diagram illustrating image scaling in accordance with an embodiment of the present invention.

To illustrate further, FIGS. 6A and 6B show an example where the XScale and YScale factors are individually set to 1.78 while the corresponding YScale and XScale factors are set to 1.0, respectively. FIG. 6A shows that the output grid 505 in the slow scan direction aligns with the slow scan input grid 500 when setting the YScale to 1.0. Likewise, FIG. 6B shows that the output grid 505 in the fast scan direction aligns with the fast scan input grid 500 when setting XScale to 1.0. The embodiments disclosed herein take advantage of the situation illustrated in FIG. 6B namely that the output grid 505 in the fast scan direction aligns with the fast scan input grid 500 with setting the XScale to 1.0, in order to accelerate the operations needed to provide both image reduction and enlargement capabilities via SIMD operations.

Figure 7A:
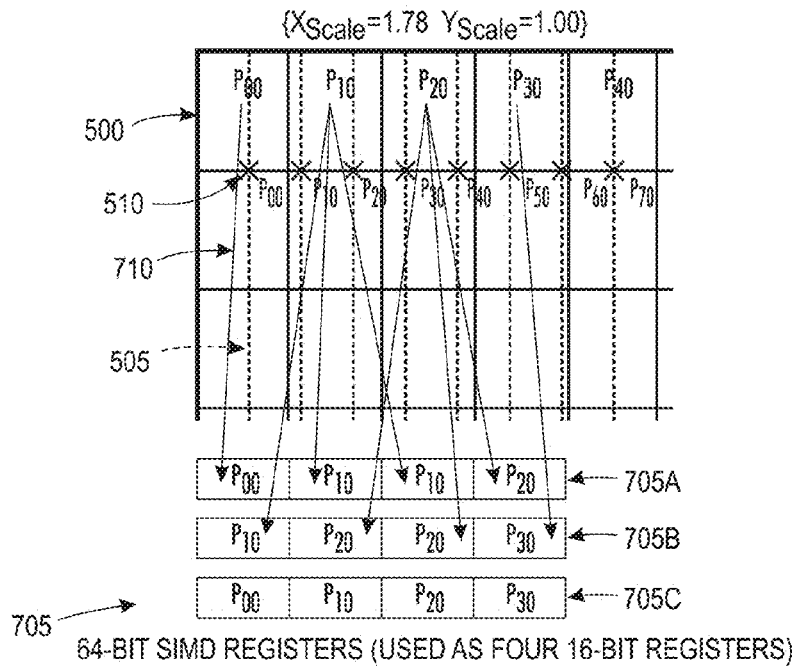
FIG. 7A depicts a diagram illustrating image scaling in accordance with an embodiment of the present invention.
Figure 7B:
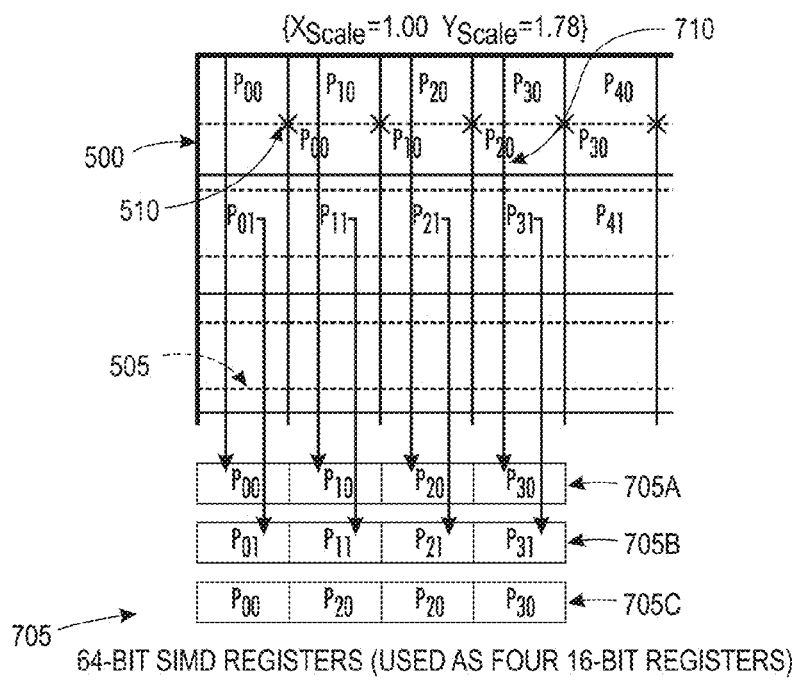
FIG. 7B depicts a diagram illustrating image scaling in accordance with an embodiment of the present invention.

FIGS. 7A and 7B illustrate an example of scaling in the x and y dimensions assuming a 64-bit SIMD register formatted as four concatenated 16-bit registers 705. In order to load the SIMD registers 705 with the appropriate pixel data needed to perform linear interpolation in the fast scan direction as shown in FIG. 7A, the pixel-to-register mapping, illustrated by 710, is somewhat complex and is a function of the scaling factor.

For example, the 64-bit SIMD register 705A would need to hold pixels [$P_{00}$, $P_{10}$, $P_{10}$, $P_{20}$] whereas register 705B would contain pixels [$P_{10}$, $P_{20}$, $P_{20}$, $P_{30}$]. Register 705C would eventually contain the interpolated output pixels [$P_{00}$, $P_{10}$, $P_{20}$, $P_{30}$]. The number of operations needed to appropriately provide this pixel-to-register "swizzle" formatting consumes valuable processor cycles. This results in a dramatic degradation in throughput performance.

Further complications can arise from the fact that the multiplication factors required to perform linear interpolation for the four output pixels are not the same, thereby requiring individual, dynamic calculations and register loads in order to utilize the SIMD multiplication intrinsic. For a scaling factor of {XScale=1.78, YScale=1.00} as shown in FIG. 7A, a SIMD register would need to contain [0.5618, 0.1236, 0.6854, 0.2472] values in order to provide the appropriate multiplication factors ultimately needed to generate the corresponding interpolated output values [$P_{00}$, $P_{10}$, $P_{20}$, $P_{30}$]. Although these fast scan multiplication factors are deterministic and could indeed be pre-calculated based upon the fast scan scaling factor (as opposed to dynamically generated), the need to keep track and access these seed factors for every four pixels would further complicate the algorithm as well as degrade performance.

On the other hand, providing the same scaling operations in the slow scan dimension as shown in FIG. 7B is much more straightforward because the pixel data is optimally arranged to match the format and intrinsic vector loading capabilities of the SIMD registers. The image data is contiguous with four pixels simultaneously retrieved via one SIMD 64-bit "load" command. As illustrated in FIG. 7B, the pixel-to-register mapping illustrated by arrows 710 perfectly aligns with the SIMD register 705 boundaries, thereby eliminating the complicated swizzle operations relative to the fast scan scenario discussed above.

For example, register 705A in FIG. 7B can load the four pixels [$P_{00}$, $P_{10}$, $P_{20}$, $P_{30}$] at one time, followed by another register load operation containing pixels [$P_{01}$, $P_{11}$, $P_{21}$, $P_{31}$] and stored in 705B. Likewise, the multiplication factors required to perform linear interpolation for {XScale=1.00, YScale=1.78} are the same for every pixel for a given output scanline, thereby requiring a one-time calculation at the beginning of each raster. For the example depicted in FIG. 7B, a SIMD register would need to contain vM=[05618, 0.5618, 0.5618, 0.5618] values and could be used over and over for every set of four pixels contained within that particular scanline. The multiplication register would then be updated at the beginning of the next scanline based upon incrementing the output pixel grid by the slow scan seed factor.

Preliminary tile-based processing can be employed in order to allow multi-threading applications and to minimize the need to store and process full-size images at the output of every image-processing node contained within software image copy path 400. This reduces the overall system memory requirements for implementation of the methods and systems described herein.

Figure 8:
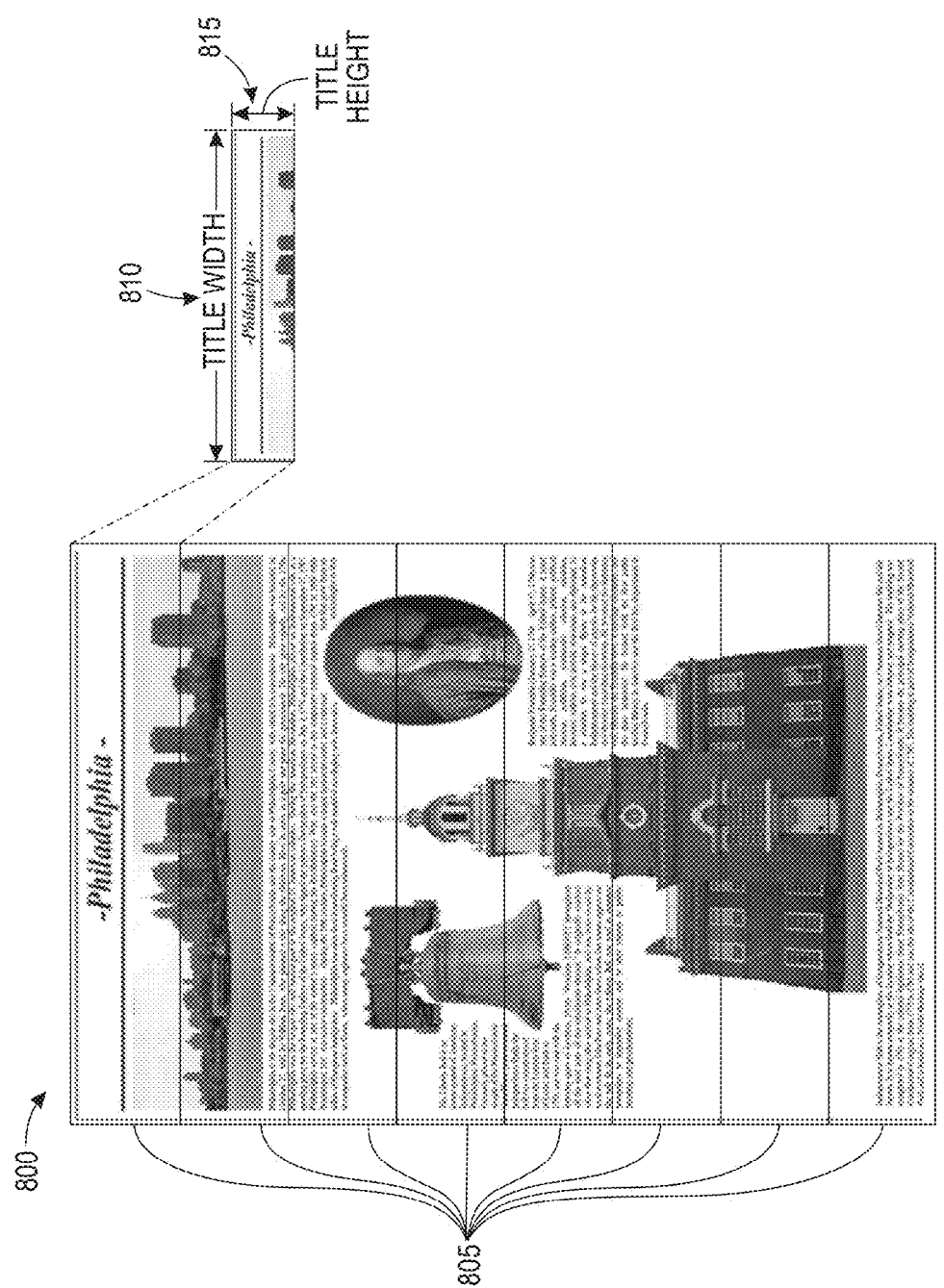
FIG. 8 illustrates an embodiment of a system for partitioning an image in accordance with an embodiment of the present invention.

FIG. 8 illustrates the concept of partitioning an input image 800 into tiles 805 in accordance with embodiments of the invention. Preferably, the tile width 810 extends the length of one scanline. The tile height 815 is set to cache-friendly boundaries, such as 16, 32, or 64 scanlines (i.e., 2N). It should be appreciated that partitioning of the input image may be accomplished using a sub-node of node 405 or may be independently performed before the image reaches node 405.

Complications may arise when partitioning the input image into tiles if the scaled output grid is out of phase relative to the native input grid. To solve this problem, the input tile height 815 delivered to the scaling node 405 can be adjusted by a few scanlines to ensure that the scaled tile height processed and delivered by each thread has the same output dimensions. In other words, for some scaling factors, the input tiles 805 may overlap one another by one or more scanlines in order to provide the proper amount of image information to apply either linear interpolation and/or pixel summation (perspective projection) scaling.

The amount of tile overlap is dependent upon a number of factors such as the reduction/enlargement XScale and YScale settings, tile 805 location within the input source image 800, and the scaling algorithm selected (i.e., linear, cubic, perspective projection, etc.). Fortunately, the input tile 805 dimensions as well as the x/y tile origin coordinates are deterministic and can therefore be generated and loaded within a tile-mapping look up table at compile time. This tile-mapping information is then used by each thread in order to access the proper input image tile.

As illustrated by FIGS. 5-7, conventional scaling in the fast scan direction is problematic because it requires relatively complex pixel swizzling operations to load the vector registers 705 in the proper format for acceleration. Scaling in the slow scan direction, however, contains all the favorable characteristics needed to optimally load the vector registers 705 and perform high-speed SIMD operations.

Figure 9:
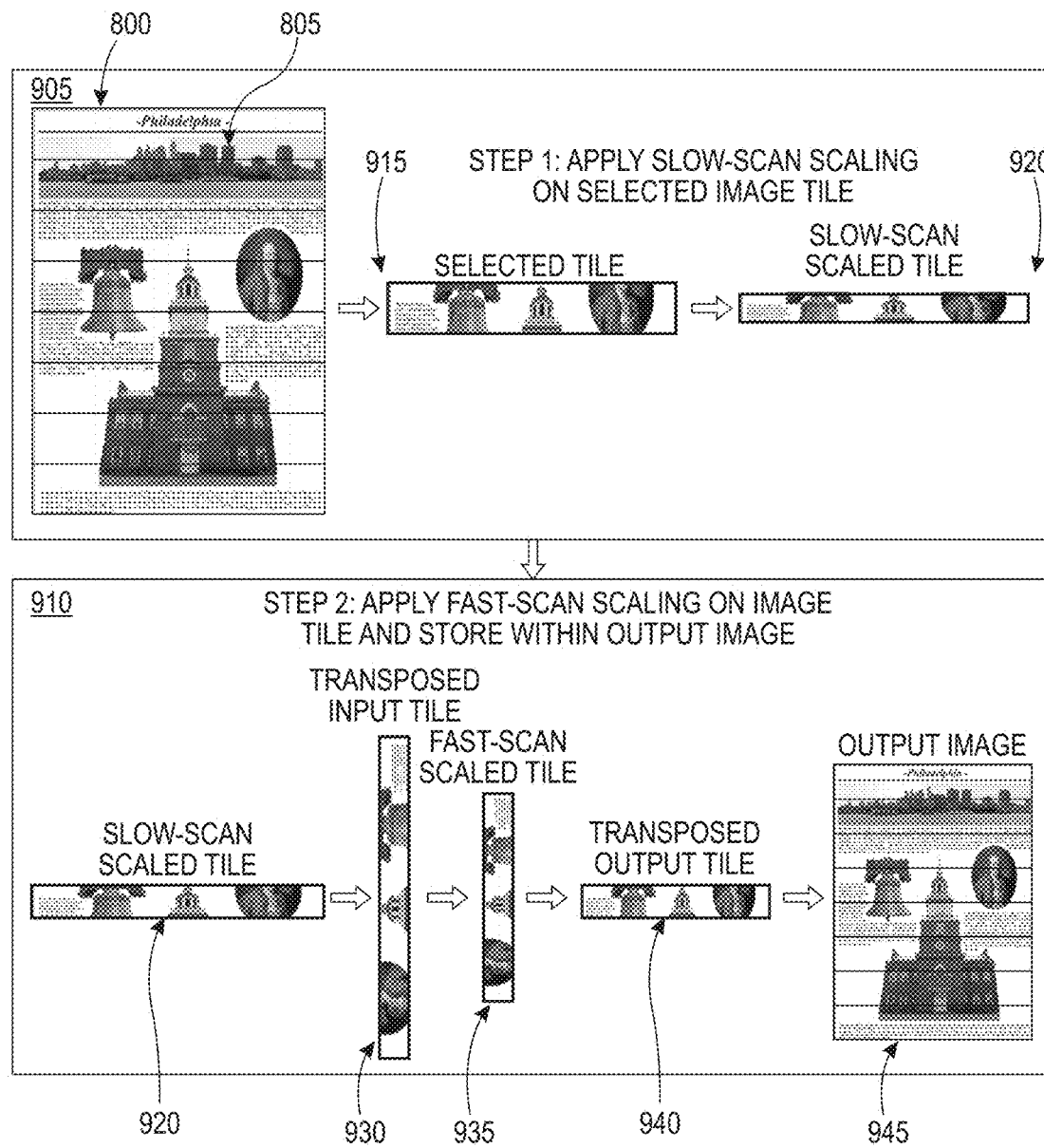
FIG. 9 depicts steps associated with a system and method for scaling an image in accordance with example embodiments.

In order to leverage the favorable attributes of scaling in the slow scan direction for SIMD operations, in one embodiment resizing is accomplished in two distinct steps. FIG. 9 illustrates these steps. Note that in FIG. 9, the input image 800 has already been partitioned into tiles 805. The first step 905 applies scaling in the conventional slow scan direction. This is accomplished by first selecting a tile 915 and then slow scan scaling that tile 920.

The second step 910 comprises transposing the slow scanned tile 920 before it is scaled. The transposed tile 930 can then be scaled in the preferable vertical slow scan direction, which is effectively equivalent to scaling in the fast scan direction, but much more efficient. Fast scanned tile 935 is produced as a result of slow scanning the transposed tile 930. After applying the scaling, the image can be transposed again to its original orientation into tile 940. As each tile 805 completes these steps, it can be re-assembled into a scaled output image 945. It should be appreciated that these steps may be accomplished at or near real time in computer graphics applications, or in other at or near real time audio-visual presentations (e.g., television, movies, streaming video, etc.).

Note that using steps 905 and 910, the actual processing for the "fast scan" resizing step is in the SIMD-friendly vertical direction. This is accomplished by first transposing the input tile image 920. The timesavings for automatically loading the vector registers (such as registers 705) far outweighs the extra processing needed to transpose tile 920 before and after scaling.

Figure 10:
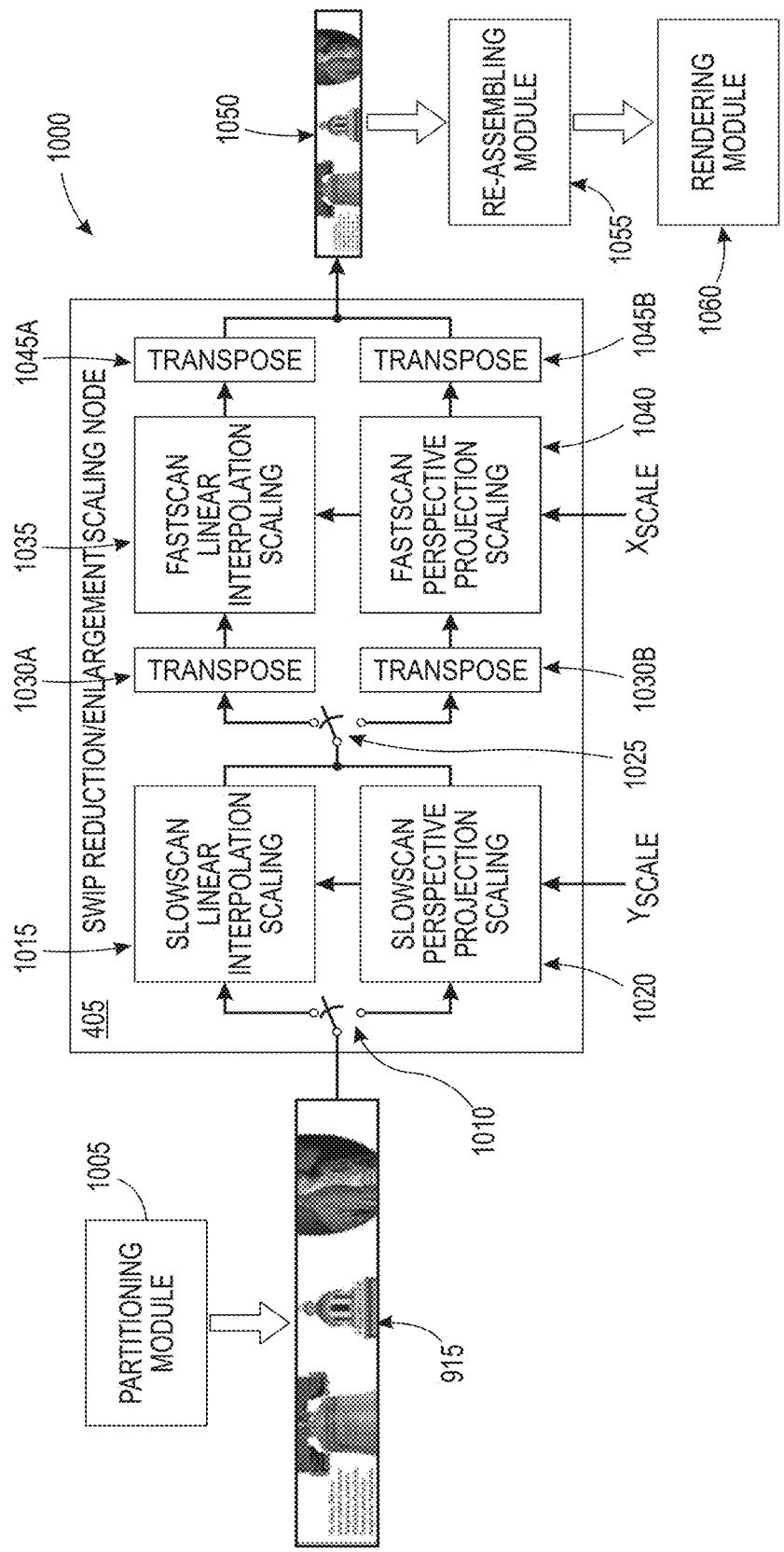
FIG. 10 depicts a system for partitioning, scaling, and rendering an image in accordance with an embodiment of the present invention.

FIG. 10 illustrates a system 1000 for scaling an image. The system 1000 includes a partitioning module 1005. The partitioning module 1005 conducts the process shown in FIG. 8, wherein an input image is partitioned into tiles 805. Partitioned tiles 805 are then provided as individual selected tiles 915. The individual selected tiles 915 are next provided to scaling node 405.

Image scaling node 405 includes sub-nodes for various processes. In the Y scaling (slow scan) directions, image scaling node 405 includes a sub-node for slow scan linear interpolation scaling 1015 and a sub-node for slow scan perspective projection scaling 1020. Node 405 includes a decision switch 1010 that allows selection of either of these slow scan scaling options. Nodes 1015 or 1020 can be used to slow scan scale the input tile 915. Once the slow scan is complete, the image tile is passed via decision switch 1025 to either of transposing nodes 1030A or 1030B. Either of nodes 1030A or 1030B will transpose the input tile before scaling in the x direction. Node 1035 is a fast scan linear interpolation scaling node and node 1040 is a fast scan perspective projection scaling node. These nodes provide scaling of the transposed input image in the x scaling direction by vertically scaling the transposed tile. Either of nodes 1045A and 1045B again transpose the image tile to its original orientation. The output of node 405 is a scaled tile 1050.

Tile 1050 can be provided to a re-assembling module 1055. The re-assembling module takes each of the output tiles 1050 and re-assembles them into a scaled version of the original input image. In a preferred embodiment, the reassembled scaled image can be rendered using rendering module 1060.

In addition to the advantages of the architecture shown in FIG. 10, decomposing the scaling operation into two, one-dimensional steps provides the ability to utilize different scaling algorithms depending upon the desired application. For example, the attributes of the perspective projection algorithm are best applied when scaling-down images that contain halftone content because it minimizes moiré, whereas linear and/or cubic interpolation scaling is normally utilized for enlargement purposes.

The systems and methods described herein provide the ability to easily select which scaling algorithm(s) to use as illustrated by decision switches 1010 and 1025. This provides the flexibility to maximize image quality and performance for the given application. For example, in FIG. 10 perspective projection sub-node 1020 can be used for reduction in the slow scan direction while using linear interpolation sub-node 1035 for enlargement in the other direction, thereby providing a hybrid anamorphic scaling option.

Figure 11:
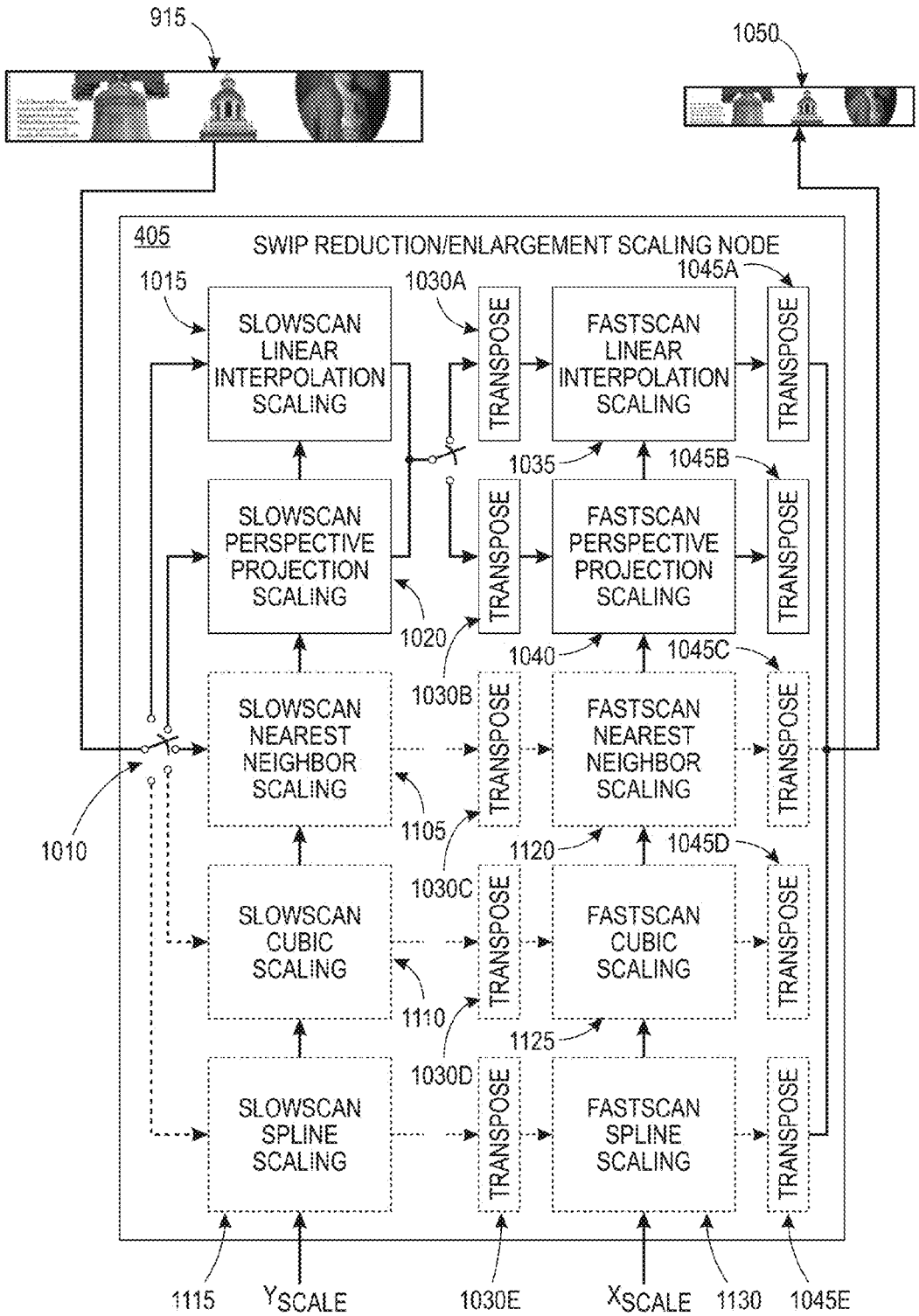
FIG. 11 depicts a system for scaling an image in accordance with another embodiment of the present invention.

In addition to linear and perspective projection, additional scaling algorithms may be incorporated in node 405. FIG. 11 illustrates an embodiment of node 405 comprising a variety of scaling sub-nodes. Such scaling algorithms may include nearest neighbor scaling by nearest neighbor scaling node 1105, cubic scaling by cubic scaling node 1110, spline scaling using spline scaling node 1115, etc. This provides additional flexibility and processing capabilities. Using the two-step approach allows each additional scaling node to fully exploit the high-speed SIMD intrinsics available on today's advanced multi-core processors. Transposing nodes 1030A-E and 1045A-E are required for transposing the image before and after scaling in the X direction. X direction scaling can be accomplished using nearest neighbor scaling by nearest neighbor scaling node 1120, cubic scaling by cubic scaling node 1125, or spline scaling using spline scaling node 1130. It should be appreciated that any number of additional scaling algorithms and nodes may be added depending on the specific design considerations.

Figure 12:
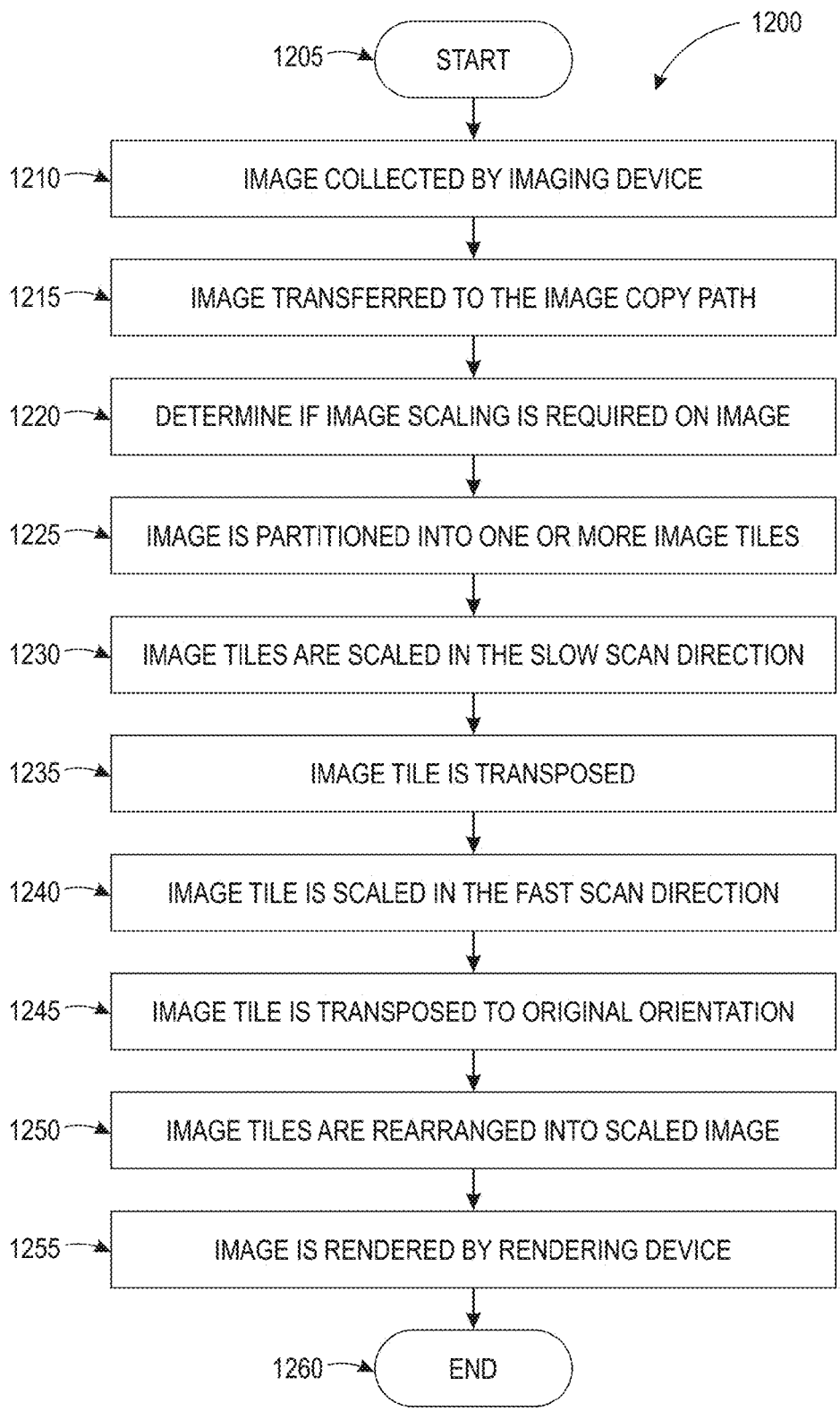
FIG. 12 depicts a flow chart of logical operational steps associated with a method for scaling an image in accordance with an embodiment of the invention.

FIG. 12 illustrates logical operational steps associated with a method 1200 for scaling an image. The method begins at step 1205. At step 1210, an image can be collected by an image capturing device. The image can then be transferred to an image copy path, such as SWIP 400, at step 1215. Next a determination is made if image scaling is required on the image at step 1220. If no image scaling is required, the method is completed.

However, if image scaling is required, at step 1225 the image can be partitioned into one or more tiles. If multiple tiles are formed, then each tile is subject to the remaining steps. At step 1230, the image tiles are first scaled in the "slow scan" vertical direction according to any desired algorithm. The image tiles are then transposed at step 1235 so that scaling in the fast scan direction at step 1240 is optimized. Each of the image tiles are then again transposed at step 1245 to their original orientation. The image tiles can then be rearranged into a scaled image at step 1250 and the scaled image can be rendered at step 1255. The method ends at step 1260.

Figure 13:
FIG. 13 depicts a table illustrating improved efficiency resulting from the methods and systems disclosed herein.

FIG. 13 provides a table 1300 illustrating the stand-alone processing throughput rate when scaling a 5120×6600 A4 input image via the embodiments described herein compared to its scalar (non-parallel, non-vectorized) and conventional (one-step SIMD) counterparts when run on an i7 microprocessor under various XScale and YScale factors and threads. In both cases, a significant improvement in throughput rate is realized.

The speedup factors via the two-stage tile-based scaling disclosed herein shows the benefits of utilizing SIMD operations to accelerate video throughput rates. For a single-thread application, which would approximately correspond to a copy image-path where the number of image-processing nodes far exceeds the number of threads available, a speedup of over 5 times and 3 times is realized when compared to its scalar and conventional software node counterparts, respectively.

Based on the foregoing, it can be appreciated that a number of embodiments, preferred and alternative, are disclosed herein. For example, in one embodiment, a method for image scaling comprises partitioning an image into at least one image tile, determining if said at least one image tile requires at least one of slow scan scaling and a fast scan scaling, and scaling said at least one image tile with at least one of slow scan scaling and fast scan scaling according to said determination.

In one embodiment, fast scan scaling said at least one image tile further comprises transposing said at least one image tile, fast scan scaling said at least one image tile, and transposing said scaled image tile to an original orientation. Slow scan scaling and fast scan scaling said at least one image tile further comprises slow scan scaling said at least one image tile, transposing said at least one image tile, fast scan scaling said at least one image tile, and transposing said scaled image tile to an original orientation.

In another embodiment, determining if said at least one image tile requires at least one of slow scan scaling and a fast scan scaling, and scaling said at least one image tile with at least one of slow scan scaling and fast scan scaling according to said determination is performed in parallel on a plurality of said at least one image tiles. Slow scan scaling comprises at least one of linear interpolation scaling, perspective projection scaling, nearest neighbor scaling, cubic scaling, and spline scaling. Fast scan scaling comprises at least one of linear interpolation scaling, perspective projection scaling, nearest neighbor scaling, cubic scaling, and spline scaling.

In another embodiment slow scan scaling comprises at least one of linear interpolation scaling, perspective projection scaling, nearest neighbor scaling, cubic scaling, and spline scaling. And said fast scan scaling comprises at least one of linear interpolation scaling, perspective projection scaling, nearest neighbor scaling, cubic scaling, and spline scaling.

In another embodiment, the method further comprises receiving an image from an image capturing device. The method may also comprise concatenating said at least one tile into a scaled image and rendering said image with a rendering device.

In another embodiment, the method for image scaling comprises receiving an image from an image capturing device, partitioning an image into at least one image tile using a partitioning module, determining if said at least one image tile requires at least one of slow scan scaling and a fast scan scaling, slow scan scaling said at least one image tile, transposing said at least one image tile, scaling said at least one transposed image tile in a fast scan direction, transposing said at least one image tile to an original orientation, reassembling said at least one image tile into a scaled image, and rendering said scaled image on a rendering device. Slow scan scaling comprises at least one of linear interpolation scaling, perspective projection scaling, nearest neighbor scaling, cubic scaling, and spline scaling; and said fast scan scaling comprises at least one of linear interpolation scaling, perspective projection scaling, nearest neighbor scaling, cubic scaling, and spline scaling.

In another embodiment, a system for image scaling comprises a processor and a computer-usable medium embodying computer code, said computer-usable medium being coupled to said processor, said computer code comprising non-transitory instruction media executable by said processor comprising a partitioning module configured to partition an image into at least one image tile; a scaling node configured to determine if said at least one image tile requires at least one of slow scan scaling and a fast scan scaling, scales said at least one image tile with at least one of slow scan scaling and fast scan scaling according to said determination; and a reassembling module configured to reassemble said at least one image tile into a scaled image.

Fast scan scaling said at least one image tile further comprises transposing said at least one image tile, fast scan scaling said at least one image tile, and transposing said scaled image tile to an original orientation. Slow scan scaling and fast scan scaling said at least one image tile further comprises slow scan scaling said at least one image tile, transposing said at least one image tile, fast scan scaling said at least one image tile, and transposing said scaled image tile to an original orientation.

In another embodiment of the scaling node, determining if said at least one image tile requires at least one of slow scan scaling and a fast scan scaling and scaling said at least one image tile with at least one of slow scan scaling and fast scan scaling according to said determination is performed in parallel on a plurality of said at least one image tiles.

In another embodiment of the system, said slow scan scaling comprises at least one of linear interpolation scaling, perspective projection scaling, nearest neighbor scaling, cubic scaling, and spline scaling. The fast scan scaling comprises at least one of linear interpolation scaling, perspective projection scaling, nearest neighbor scaling, cubic scaling, and spline scaling.

Alternatively, slow scan scaling comprises at least one of linear interpolation scaling, perspective projection scaling, nearest neighbor scaling, cubic scaling, and spline scaling; and said fast scan scaling comprises at least one of linear interpolation scaling, perspective projection scaling, nearest neighbor scaling, cubic scaling, and spline scaling.

In another embodiment, the system further comprises an image capturing device configured to collect an image and transmit said image to said partitioning module, and a rendering device for rendering said scaled image.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A method for image scaling comprising:
partitioning an image into at least one image tile;
scaling said at least one image tile in a slow scan direction;
rotating said at least one image tile scaled in said slow scan direction 90 degrees;
scaling said at least one rotated image tile in said slow scan direction in order to effectively fast scan scale said rotated image tile; and
rotating said at least one image tile to an original orientation.

2. The method of claim 1 further comprising:
collecting an image with an imaging device.

3. The method of claim 2 further comprising:
transferring said image to an image copy path.

4. The method of claim 1 further comprising:
determining if said at least one image tile requires scaling.

5. The method of claim 1 wherein said slow scan scaling comprises at least one of:
linear interpolation scaling;
perspective projection scaling;
nearest neighbor scaling;
cubic scaling; and
spline scaling.

6. The method of claim 1 wherein said scaling said at least one rotated image tile in said slow scan direction in order to effectively fast scan scale said at least one rotated image tile comprises at least one of:
linear interpolation scaling;
perspective projection scaling;
nearest neighbor scaling;
cubic scaling; and
spline scaling.

7. The method of claim 1 wherein partitioning an image into at least one image tile further comprises partitioning said image into a plurality of image tiles; and
wherein said plurality of image tiles are scaled in a slow scan direction in parallel; said plurality of image tiles scaled in said slow scan direction are rotated 90 degrees in parallel; said plurality of rotated image tiles are scaled in said slow scan direction in order to effectively fast scan scale said plurality of rotated image tiles in parallel; and said plurality of image tiles are rotated to an original orientation in parallel.

8. The method of claim 7 further comprising concatenating said plurality of scaled tiles into a scaled image.

9. The method of claim 1 further comprising:
rendering said image with a rendering device.

10. A method for image scaling comprising:
receiving an image from an image capturing device;
partitioning an image into a plurality of image tiles using a partitioning module;
slow scan scaling said plurality of image tiles;
rotating said plurality of image tiles 90 degrees;
scaling said plurality of rotated image tiles in said slow scan direction in order to effectively fast scan scale said plurality of rotated image tiles;
rotating said plurality of image tiles to an original orientation;
reassembling said plurality of image tiles into a scaled image; and
rendering said scaled image on a rendering device.

11. The method of claim 10 wherein said slow scan scaling comprises at least one of:
linear interpolation scaling;
perspective projection scaling;
nearest neighbor scaling;
cubic scaling; and
spline scaling.

12. A system for image scaling comprising:
a processor; and
a computer-usable medium embodying medium being coupled to said processor, said computer code comprising non-transitory instruction media executable by said processor comprising:
a partitioning module configured to partition an image into at least one image tile;
scaling said at least one image tile in a slow scan direction;
rotating said at least one image tile scaled in said slow scan direction 90 degrees;
scaling said at least one rotated image tile in said slow scan direction in order to effectively fast scan scale said rotated image tile; and
rotating said at least one image tile to an original orientation.

13. The system of claim 12 further comprising:
an imaging device configured to collect an image.

14. The system of claim 13 further comprising:
an image copy path, wherein said image is transferred to said image copy path.

15. The system for image scaling of claim 12 further comprising:
determining if said at least one image tile requires scaling.

16. The system of claim 12 wherein said slow scan scaling comprises at least one of:
linear interpolation scaling;
perspective projection scaling;
nearest neighbor scaling;
cubic scaling; and
spline scaling.

17. The system of claim 12 wherein scaling said at least one rotated image tile in said slow scan direction in order to effectively fast scan scale said at least one rotated image tile comprises at least one of:
linear interpolation scaling;
perspective projection scaling;
nearest neighbor scaling;
cubic scaling; and
spline scaling.

18. The system of claim 12 wherein said partitioning module is further configured to partition said image into a plurality of image tiles; and
wherein said plurality of image tiles are scaled in a slow scan direction in parallel; said plurality of image tiles scaled in said slow scan direction are rotated 90 degrees in parallel; said plurality of rotated image tiles are scaled in said slow scan direction in order to effectively fast scan scale said plurality of rotated image tiles in parallel; and said plurality of image tiles are rotated to an original orientation in parallel.

19. The system of claim 18 further comprising concatenating said plurality of scaled tiles into a scaled image.

20. The system of claim 12 further comprising:
a rendering device for rendering said scaled image.

* * * * *